(12) United States Patent
Cook et al.

(10) Patent No.: US 7,051,493 B2
(45) Date of Patent: May 30, 2006

(54) HIGH MODULUS, TEMPERATURE-RESISTANT FILM FOR FORM FILL AND SEAL PACKAGING

(75) Inventors: Hubert J. Cook, Greer, SC (US); Janet W. Rivett, Simpsonville, SC (US); Gautam P. Shah, Simpsonville, SC (US); Richard M. Dayrit, Simpsonville, SC (US); Kelly R. Ahlgren, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 219 days.

(21) Appl. No.: 10/225,815

(22) Filed: Aug. 21, 2002

(65) Prior Publication Data

US 2004/0038012 A1 Feb. 26, 2004

(51) Int. Cl.
*B65B 9/00* (2006.01)
*B65B 63/00* (2006.01)
*B65B 55/00* (2006.01)
*B32B 7/02* (2006.01)
*B32B 27/08* (2006.01)

(52) U.S. Cl. .......................... 53/450; 53/518; 53/433; 53/434; 53/408; 426/127; 426/130; 426/410; 428/36.91; 428/34.8; 428/212; 428/475.8; 428/483; 428/515; 428/519

(58) Field of Classification Search ............. 428/36.91, 428/34.8, 34.9, 35.2, 212, 475.8, 483, 515, 428/519; 156/244.11, 244.24; 53/518, 450, 53/433, 434, 408; 426/127, 130, 410

See application file for complete search history.

(56) References Cited

U.S. PATENT DOCUMENTS

| | | | |
|---|---|---|---|
| 3,943,683 A | 3/1976 | Kovac et al. ................... 53/51 |
| 4,302,565 A | 11/1981 | Goeke et al. ................. 526/88 |
| 4,302,566 A | 11/1981 | Karol et al. ................. 526/125 |
| 5,206,075 A | 4/1993 | Hodgson, Jr. ................ 428/216 |
| 5,241,031 A | 8/1993 | Mehta ...................... 526/348.1 |
| 5,272,236 A | 12/1993 | Lai et al. ................. 526/348.5 |
| 5,278,272 A | 1/1994 | Lai et al. ................. 526/348.5 |
| 5,885,704 A * | 3/1999 | Peiffer et al. ............ 428/315.9 |
| 6,017,616 A | 1/2000 | Kochem et al. |
| 6,488,972 B1 * | 12/2002 | Cerani ........................ 426/110 |
| 6,641,925 B1 * | 11/2003 | Beer et al. .................. 428/518 |
| 2001/0008687 A1 | 7/2001 | Kollaja et al. |

FOREIGN PATENT DOCUMENTS

| | | |
|---|---|---|
| EP | 1 174 262 A1 | 1/2002 |
| EP | 1 219 412 A1 | 7/2002 |
| WO | 93/03093 | 2/1993 |
| WO | 94/03414 | 2/1994 |
| WO | WO 95/33621 | 12/1995 |

OTHER PUBLICATIONS

"Determination of Branching Distributions in Polyethylene and Ethylene Copolymers", L. Wild, Journal of Polymer Science, vol. 20, pp. 441-455 (1982).
"Standard Practice for Conditioning Plastics for Testing", ASTM D618-00, pp. 1-4.
"Standard Test Method for Tensile Properties of Plastics", ASTM D638-00, pp. 1-13.
"Standard Test Methods for Tensile Properties of Thin Plastic Sheeting", ASTM D882, pp. 194-199.
"Standard Test Method for Unrestrained Linear Thermal Shrinkage of Plastic Film and Sheeting", ASTM D2731-83, pp. 368-371.
"Standard Test Method for Oxygen Gas Transmission Rate Through Plastic Film and Sheeting Using a Coulometric Sensor", ASTM D3985-95, pp. 489-494.
"Standard Practice for Plastics: Dynamic Mechanical Properties: Determination and Report of Procedures", ASTM D4064-01, pp. 1-6.
"Standard Test Method for Measuring the Dynamic Mechanical Properties of Plastics in Tension", ASTM D5026-95a, pp. 1-4.
Patent Abstracts of Japan, vol. 2000, No. 03, Mar. 30, 2000 & JP 11 333999 A (Unitika Ltd), Dec. 7, 1999.
Patent Abstracts of Japan, vol. 018, No. 653 (M-1720), Dec. 12, 1994 & JP 06 255053 A (Toray Ind Inc), Sep. 13, 1994.

\* cited by examiner

Primary Examiner—Rena Dye
Assistant Examiner—Lawrence Ferguson
(74) Attorney, Agent, or Firm—Rupert B. Hurley, Jr.

(57) ABSTRACT

A multilayer film, which is particularly suited to packaging of cheese on a Hayssen® RT packaging machine, has a first layer comprising cyclic olefin copolymer having a glass transition temperature of at least 125° C., and a second layer comprising at least one member selected from the group consisting of cyclic olefin copolymer having a glass transition temperature of at least 125° C., polyamide, polyester, and polystyrene. The first and second layers are on opposite sides of a tensile axis of symmetry of the film. The film exhibits from 0 to 45 degrees of transverse edge curl, a yield point of at least 1200 psi at a temperature of 85° C., and an elongation at break of from 0 to 300 percent at 85° C. In addition, a packaging process comprises supplying the film and placing a plurality of product units on the flat film at desired intervals, forwarding the flat film having product units thereon, while forming a tubing from the flat film so that product is inside the tubing, followed by sealing the film along its length and transversely (upstream and downstream of the product), so that the product is a discrete packaged product is formed.

20 Claims, 2 Drawing Sheets

HIGH MODULUS, TEMPERATURE-RESISTANT FILM FOR FORM FILL AND SEAL PACKAGING

FIELD OF THE INVENTION

The present invention pertains to the field of films, particularly packaging films, and even more particularly to films suited to use in form-fill-and-seal packaging, particularly the packaging of cheese.

BACKGROUND OF THE INVENTION.

For several decades, consumer blocks of cheese have been packaged in form-fill-and-seal packaging machines. The most common form-fill-and-seal packaging machine for the packaging of cheese is the Hayssen® RT horizontal form-fill-and-seal packaging machine. The Hayssen® RT packaging machine forwards the film by pulling on the downstream portion of the film with hot seal bars. See U.S. Pat. No. 3,943,683, which discloses a Hayssen® RT packaging apparatus.

In order to be operable on the Hayssen® RT machine, the packaging film must have good strength when hot, i.e., good strength at a relatively high yield point, or the film will fail (break) during the transverse sealing step. Most of the films which have been used on the Hayssen® RT packaging machine in the past have been laminated barrier films. These films have been prepared by laminating together an oxygen-barrier film with at least one heat-resistant film. These films were, of course, separately extruded. The oxygen-barrier film has a layer which is a barrier to the transmission of atmospheric oxygen, to extend the shelf-life of the cheese being packaged. The heat-resistant film has a layer providing a high yield point, to allow the laminate to undergo processing on the Hayssen® RT packaging machine, without the film yielding under the combination of heat and tension encountered during transverse sealing. Production of the film using a lamination-based process has been carried out because the extrusion conditions for the biaxially-oriented crystalline polyester and/or polypropylene used in the heat-resistant film are not compatible with the extrusion conditions for the barrier film. Moreover, the heat-resistant film (films) has been made using a polyester and/or polypropylene which has been biaxially oriented in the solid state and thereafter heatset,which is not necessary for the barrier film.

Another film which has been used for cheese packaging on the Hayssen® RT machine is a fully coextruded film which is oriented in the solid state and thereafter heatset. This coextruded film contains an oxygen-barrier layer, as well as a temperature-resistant layer. The extrudate must be biaxially-oriented and heatset in order for the crystalline polyamide to have the desired heat-resistant properties and tensile modulus for the film to be operable on the Hayssen® RT packaging machine. It would be desirable to provide a film suitable for the packaging of cheese on the Hayssen® RT packaging machine, without having to either laminate two films together and without having to orient a film in the solid state.

SUMMARY OF THE INVENTION

The film of the present invention can be produced by a single coextrusion of all of the layers of the film, while at the same time providing desired qualities for use in an application requiring low curl, high stiffness, and high heat resistance. For example, the multilayer film of the present invention provides the heat-resistance, stiffness, and low curl for advantageous use on a Hayssen® RT packaging machine for the packaging of cheese. The film provides these characteristics in combination with the capability of being produced without having to laminate two films together, and without having to utilize solid state orientation. The desired stiffness and heat resistance is provided at least in part by the presence of a cyclic olefin copolymer having a glass transition temperature (i.e., "Tg") of at least 125° C. in a first layer of the film. A second layer of the film also comprises a polymer having a relatively high modulus, with the first and second film layers being on opposing sides of a tensile axis of symmetry of the film, so that the film is flat, i.e., exhibits relatively low transverse edge curl.

The cyclic olefin copolymer can be extruded under conditions compatible with the remaining layers of the multilayer film, such as an oxygen barrier layer, tie layers, a seal layer, and an abuse layer. Thus, the cyclic olefin copolymer provides the film with temperature resistance, while being compatible for coextrusion with ethylene-based polymers in other film layers. The cyclic olefin copolymer also contributes to the low curl, low yield point at elevated temperature, and low elongation at break at elevated temperature, to make the film suitable for packaging operations under conditions presented by a Hayssen® RT packaging machine, as well as other similar packaging conditions.

As a first aspect, the present invention is directed to a multilayer web or film, comprising:(A) a first layer comprising cyclic olefin copolymer having a glass transition temperature of at least 125° C., and (B) a second layer comprising at least one member selected from the group consisting of cyclic olefin copolymer having a glass transition temperature of at least 125° C., polyamide, polyester, and polystyrene. The first and second layers are on opposite sides of a tensile axis of symmetry of the multilayer film, with the film exhibiting from 0 to 45 degrees of transverse edge curl, a yield point of at least 1200 psi at a temperature of 85° C., and an elongation at break of from 0 to 300 percent at 85° C. Preferably, the cyclic olefin copolymer has a Tg from 125° C. to 200° C.; more preferably, from 125° C. to 170° C. Preferably, the polyamide comprises amorphous polyamide.

Preferably, the multilayer film exhibits a yield point of at least 1200 psi at a temperature of 100° C., and an elongation at break of up to 200 percent at 100° C. More preferably, the multilayer film exhibits a yield point of at least 1200 psi at a temperature of 120° C., and an elongation at break of up to 300 percent at 120° C. Preferably, the multilayer film exhibits a yield point of at least 1200 psi at a temperature of 130° C., and an elongation at break of up to 300 percent at 130° C. Preferably, the multilayer film exhibits a yield point of at least 1200 psi at a temperature of 140° C., and an elongation at break of up to 300 percent at 140° C. Preferably, the multilayer film exhibits a exhibits a yield point of at least 1200 psi at a temperature of 150° C., and an elongation at break of up to 300 percent at 150° C.

Preferably, the multilayer film exhibits a complex modulus (as well as a Young's Modulus) of from 30,000 to 500,000 psi throughout a temperature range of from 100° C. to 150° C.; more preferably, from 40,000 to 250,000 psi; more preferably, from 50,000 to 100,000 psi; more preferably, from 50,000 to 80,000 psi.

Preferably, the multilayer film has a thickness of from 0.5 mil to 10 mils; more preferably, from 1 to 5 mils; more preferably, from 2 to 2.5 mils.

Preferably, the multilayer film further comprises a seal layer which comprises at least one member selected from the group consisting of homogeneous ethylene/alpha-olefin copolymer, very low density polyethylene, ionomer, ethylene/unsaturated ester copolymer, and ethylene/unsaturated acid copolymer.

Preferably, the film further comprises an $O_2$-barrier layer comprising at least one member selected from the group consisting of polyvinylidene chloride (including vinylidene chloride/methyl acrylate copolymer, vinylidene chloride/vinyl chloride copolymer, and vinylidene chloride methmethylacrylate copolymer), hydrolyzed ethylene vinyl acetate copolymer (i.e., "EVOH", also referred to as "HEVA"), polyamide, polyalkylene carbonate, polyacrylonitrile.

Preferably, the film further comprises one or more tie layers comprising at least one member selected from the group consisting of modified ethylene/alpha-olefin copolymer, modified ethylene/unsaturated ester copolymer, modified ethylene/unsaturated acid copolymer, and polyurethane. Preferably, the tie layer has a thickness of from about 0.05 to 2 mils, more preferably, 0.05 to 0.5 mil, more preferably, 0.08 to 0.4 mil, and more preferably, from about 0.09 to 0.3 mil.

Preferably, the film comprises a crosslinked polymer network. The crosslinked polymer network can be produced by any one or more of a variety of means for crosslinking, including irradiation. Crosslinking improves the strength of the polyolefin portions of the film.

Preferably, the film has a total free shrink of less than 10 percent at 185° F.; more preferably, less than 5 percent in each direction; more preferably, a total free shrink less than 5 percent.

As a second aspect, the invention pertains to a packaging process comprising the steps of: (A) supplying an elongate flat multilayer film in accordance with the first aspect of the present invention; (B) placing a plurality of product units on the flat film at desired intervals; (C) forwarding the flat film having product units thereon, (D) forming a tubing from the flat film so that product is inside the tubing upon reconfiguring the flat film to a tubing around the product, with longitudinal edge portions of the film being adjacent one another once the flat film has been reconfigured; (E) forming a longitudinal seal along a segment of the adjacent edge portions of the film, to form a sealed tubing segment, with a single product unit being inside of the sealed tubing segment; (F) forming a first transverse seal across the sealed tubing segment at a first location which is downstream of the single product unit; (G) severing the film downstream of the first transverse seal; (H) forming a second transverse seal across the sealed tubing segment at a second location which is upstream of the single product unit; and (I) severing the sealed tubing segment from the multilayer film upstream of the second transverse seal, whereby a discrete packaged product is formed with the single product unit surrounded by the multilayer film. The forwarding of the flat film having the product units thereon is carried out by pulling on the film tubing with a means for making the first transverse seal and thereafter with a means for making the second transverse seal, while both the means for making the first transverse seal and the means for making the second transverse seal are at a temperature high enough to seal an inside layer of the film to itself.

Preferably, the means for making the first transverse seal comprises a seal bar having a temperature of from 70 to 150° C., and the means for making the second transverse seal comprises a seal bar having a temperature of from 70 to 150° C. More preferably, the means for making the first and second seals comprise respective seal bars having a temperature of from 90 to 140° C.; more preferably, from 100 to 130° C.

Preferably, the flat film having the product units thereon is forwarded horizontally, in a horizontal form fill and seal process. While the product units placed on the film can comprise any discrete, non-flowable product, including (for example) bakery products, paper, pet food, wet wipes, sponges, etc, a preferred product unit comprises cheese. Preferred cheese-containing products include individual cheese blocks as well as stacked or shingled slices of cheese.

DETAILED DESCRIPTION OF THE INVENTION

Figure 1:
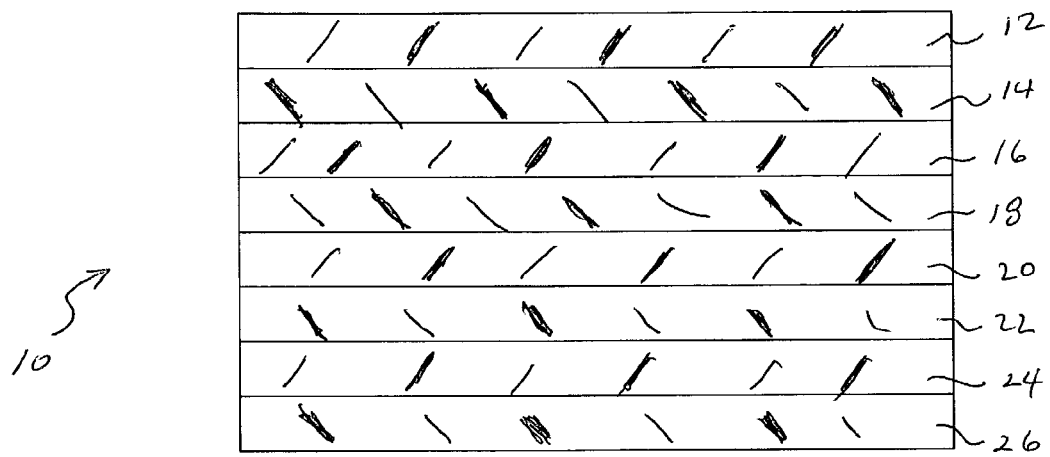
FIG. 1 is a schematic of a cross-sectional view of a preferred multilayer film in accordance with the present invention.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the phrase "cyclic olefin copolymer" refers to copolymers made by the polymerization of (A) at least one alpha-olefin comonomer with (B) at least one cyclic aliphatic comonomer (and/or at least one cyclic aromatic comonomer) having a reactive olefin portion thereof (i.e., forming a portion of the cyclic structure) or a reactive olefin portion thereon (e.g., an alpha-olefin substituent on the cyclic structure). Preferred alpha-olefin comonomers (A) include $C_2$–$C_{20}$ alpha-olefin, especially $C_2$–$C_{10}$ aliphatic alpha-olefin comonomers, and preferably one or more of $C_2$, $C_4$, $C_6$, and/or $C_8$ alpha-olefin comonomer. Norbornene is a preferred cyclic olefin comonomer. Ethylene/norbornene copolymer is an especially preferred cyclic olefin copolymer for use in the film of the present invention. Preferred ethylene/norbornene copolymer resin includes a grade considered to be suitable for making injection molded articles. Such injection-grade ethylene/norbornene resins have a lower melt index than typical film-grade ethylene/norbornene resin, e.g., a melt index of up to about 1.0 g/10 min, which corresponds with a higher molecular weight polymer. Such low melt index, high molecular weight resins produce a stiff film, which is suited for packaging cheese on a Hayssen® RT horizontal form fill and seal machine.

In the multilayer film of the present invention, a cyclic olefin copolymer having a glass transition temperature of at least 125° F. is present in at least one film layer. Preferably, the cyclic olefin copolymer is present in an amount of from 20 to 100 percent, based on layer weight; more preferably, from 50 to 100 weight percent; and more preferably, from 60 to 80 weight percent.

The multilayer film of the present invention preferably maintains a high modulus over a wide temperature range, as it is preferably a relatively stiff, inelastic film. Modulus measurements are important in a preferred film of the present invention. Complex modulus is a dynamic measurement of the elasticity of the film considered between two regimes: a viscous fluid following Newton's law of Viscosity which states that stress is proportional to the strain rate, and an elastic solid that follows Hooke's law which states that stress is proportional to strain. Complex modulus is calculated by the formula $E^*=\sqrt{E'^2+E''^2}$ where E" is the Storage Modulus which is related to the elastic response of the material to deformation, and E' is the Loss Modulus which is related to the fluid response of the material to deformation. Storage Modulus and Loss Modulus are measured on a Rheometrics RSA II Solids Analyzer in accordance with ASTM D 4065–89 and D-5026–90 methods with a Temperature Sweep at 22 rad/s from −150° C. to loss of transducer sensitivity (1 gforce unless specified otherwise) at 0.1% strain amplitude with the static force tracking dynamic force mode of autotension control and the static force equal to 140% of the dynamic force. Sample preparation was in accordance with ASTM D-618-61 (conditioning) Complex modulus is equal to Young's modulus in the linear viscoelastic region of the stress-strain plot. Young's modulus is a measure of the elasticity of the film, and is also referred to as elastic modulus and tensile modulus, and is measured in accordance with ASTM D 638, which is hereby incorporated, in its entirety, by reference thereto. Preferably, the multilayer film of the present invention has a complex modulus of from 30,000 to 500,000 psi, more preferably of from 50,000 to 350,000, and more preferably, of from 100,000 to 250,000 measured at 23° C..

As used herein, the term "seal" refers to any seal of a first region of a film surface to a second region of a film surface, wherein the seal is formed by heating the regions to at least their respective seal initiation temperatures. The sealing can be performed by any one or more of a wide variety of manners, such as using a heated bar, hot air, hot wire, infrared radiation, ultrasonic sealing, radio frequency sealing, etc. The preferred sealing mechanism is a heat seal made using a heated bar.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent. A preferred multilayer film in accordance with the present invention has on each side of an EVOH layer a layer comprising polyamide.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, a copolymer identified in terms of a plurality of monomers, e.g., "ethylene/norbomene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Ehner System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, flumaric acid or the like, or a derivative thereof such as the anhydride, ester or metal salt or the like.

As used herein, terms identifying polymers, such as "polystyrene", "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom. As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture-of a polymer and an anhydride-containing compound.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (TM) resins, and ENGAGE (TM) resins, available from the Dow Chemical Company, of Midland, Mich.), as well as TAFMER (TM) linear homogeneous ethylene/alpha-olefin copolymer resins obtainable from the Mitsui Petrochemical Corporation.

Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide, polyester, and polyvinyl chloride.

Preferably, the seal layer comprises a polymer having a melting point of from 30° C. to 150° C., more preferably from 60° C. to 125° C., and more preferably from 70° C. to 120° C. Homogeneous ethylene/alpha-olefin copolymer is a preferred polymer for use in the seal layer. Preferably, one or more polymers in the seal layer has a melt index of from 0.1 to 100 g/10 min, more preferably from 0.1 to 50 g/10 min, and more preferably from 1.0 to 40 g/10 min. Preferably, the seal layer has a thickness of from 0.05 to 5.0 mils, more preferably from 0.1 to 3.5 mils, more preferably from 0.25 to 2.0 mils.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers. Preferred tie layers comprise anhydride modified (i.e., anhydride grafted) linear low density polyethylene, and anhydride modified high density polyethylene, and ethylene propylene copolymer.

In a preferred film in accordance with the present invention, a tie layer is present between a polyolefin containing layer and a layer containing amorphous nylon. A tie layer is also present between the oxygen barrier layer and any layer containing amorphous nylon. Furthermore, it is preferred to have a tie layer between the oxygen barrier layer and any layer containing cyclic olefin copolymer. A blend of the tie layer polymer and the cyclic olefin copolymer can also be used to increase the versatility of the layer containing the cyclic olefin copolymer.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368–371, which is hereby incorporated, in its entirety, by reference thereto. Unless otherwise indicated, all free shrink values disclosed herein are, of course, "total" free shrink values, which represent a sum of (a) the percent free shrink in the longitudinal (i.e., "machine") direction dimension and (b) the percent free shrink in transverse direction.

The multilayer film of the present invention has at least two layers, and preferably has from 2 to 20 layers, more preferably 2–12 layers, more preferably 4–10 layers, more preferably 6–10 layers. A preferred 8-layer film in accordance with the present invention is illustrated in FIG. 1, in which film 10 has first layer 12 which is a skin layer, second layer 14 which is a tie layer, third layer 16 which is a tie or bulk layer, fourth layer 18 which is an oxygen barrier layer, fifth layer 20 which is a tie or bulk layer, sixth layer 22 which is a tie layer, seventh layer 24 which is a seal-assist layer, and eighth layer 26 which is a seal layer.

The multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.25 to 50 mils (1 mil equals 0.001 inch); more preferably, from about 0.5 to 10 mils; and still more preferably, from 1.0 to 3.5 mils.

TABLE I

| Resin in Example(s) | TRADE NAME | SUPPLIER | GEGENERIC NAME | CHEMICAL NATURE | KEY PROPERTIES |
|---|---|---|---|---|---|
| MB-4 | 1080864S | Clariant | masterbatch/pre-blend | polyamide 6 antiblock-slip masterbatch | Density 1.2 g/cc nylon 6/ diatomaceous earth/erucamide |
| PA6-1 | CAPRON B100WP | Honeywell | nylon 6 | polycaprolactam resin | Melt point 220° C. Density 1.135 g/cc |
| PA6-2 | ULTRAMID KR-4407 | BASF | nylon 6 | polycaprolactam resin | Melt point 220° C. medium viscosity |
| MB-1 | GRILON XE 3361 | EMS | masterbatch/pre-blend | polyamide 6 masterbatch | sp. gr. 1.14 |
| TIE-4 | PX2049 | Equistar | Resin-adhesive | anhydride grafted high density polyethylene | density 0.955 g/cc melt index 4.7 g/10 min |
| HEAO-1 | EXCEED 4518PA | EXXONMOBIL | Linear homogeneous single site catalyzed copolymer | ethylene hexene-1 copolymer | Melt index 4.5 g/10 min density 0.918 g/cc |
| MB-3 | 10853 ANTIBLOCK POLYETHYLENE MASTERBATCH | Ampacet | masterbatch/pre-blend | LLDPE with diatomaceous silica | 80.6% LLDPE 19.4% diatomaceous silica; melt index 1.5 |
| a-PA-1 | GRIVORY G21 | EMS American Grilon | resin-nylon - amorphous | Polyamide 6/ amorphous nylon | Specific gravity 1.18 |
| EVOH-3 | SOARNOL ET3803 | Nippon Gohsei supplied by Soarus Inc | resin-evoh | ethylene/vinyl alcohol copolymer | 38% ethylene flow rate; Melt Index: 2.9–3.5 grams/10 min. |
| EVOH-2 | EVAL H171B | Evalca | resin-evoh | ethylene/vinyl alcohol copolymer | Melt index 1.577; mp 173 degrees c; 38 mol % ethylene |

TABLE I-continued

| Resin in Example(s) | TRADE NAME | SUPPLIER | GEGENERIC NAME | CHEMICAL NATURE | KEY PROPERTIES |
|---|---|---|---|---|---|
| EVA1 | ELVAX 3174 | DuPont | Resin - Ethylene Vinyl Acetate | Ethylene Vinyl Acetate Copolymer | Vinyl acetate 18% Melt point 185° F. |
| LDPE | ESCORENE LD 200-48 | ExxonMobil | Resin- Polyethylene - Low Density | LDPE | Melt index 7.5; density 0.915; no additives |
| HEAO-2 | EXACT 3035 | EXXON MOBIL | Linear homogeneous single site catalyzed copolymer | Homogeneous ethylene/hexene copolymer | |
| COC3 | TOPAS 6015 | Ticona | Cyclic Olefin Copolymer resin | Ethylene/Norbornene Copolymer | Tg 150° C. |
| TIE-1 | PX3236 | Equistar | resin-tie | anhydride grafted lldpe | density 0.921; melt index 2. |
| a-PA-2 | TR55 | EMS American Grilon | Resin - Nylon - Amorphous | Nylon 12 Polyether Block Amide | Tg 160° C. |

EXAMPLE 1

With reference to FIG. 1, a multilayer film in accordance with the present invention had the following eight-layer structure (total film thickness ranging from 2.2–2.48 mils):

Layer 1: 94% EVA-1 + 6% MB3 (20.3% of total thickness of layers 1–8).
Layer 2: 60% COC3 + 40% HEAO-1 (37.2% of total thickness of layers 1–8).
Layer 3: TIE-4 (6.3% of total thickness of layers 1–8).
Layer 4: PA6-1 (6.8% of total thickness of layers 1–8).
Layer 5: EVOH-3 (9.6% of total thickness of layers 1–8).
Layer 6: PA6-1 (4.9% of total thickness of layers 1–8).
Layer 7: Tie-4 (6.3% of total thickness of layers 1–8).
Layer 8: 96% a-PA-2 + 2% MB-1 + 2% MB-4 (8.6% of total thickness of layers 1–8).

The film was fully coextruded and produced by a cast coextrusion process using a slot die, followed by a water quench upon exiting the die.

EXAMPLE 2

Again with reference to FIG. 1, multilayer films in accordance with the present invention were made as described in Example 1, each having the following eight-layer structure, with total film thicknesses ranging from 1.9 to 3.6 mils. Various film thicknesses were produced in order to identify the preferred total thickness based on field test results.

Layer 1: 94% EVA-1 + 6% MB3 (18.8% of total thickness of layers 1–8).
Layer 2: 60% COC3 + 40% HEAO-1 (39.3% of total thickness of layers 1–8).
Layer 3: TIE-4 (5.8% of total thickness of layers 1–8).
Layer 4: PA6-1 (6.4% of total thickness of layers 1–8).
Layer 5: EVOH-3 (9.3% of total thickness of layers 1–8).
Layer 6: PA6-1 (6.8% of total thickness of layers 1–8).
Layer 7: Tie-4 (6.8% of total thickness of layers 1–8).
Layer 8: 96% PA6-2 + 2% MB-1 + 2% MB-4 (6.8% of total thickness of layers 1–8).

EXAMPLE 3

Again with reference to FIG. 1, a multilayer film in accordance with the present invention was made as described in Example 1 and had the following eight-layer structure (total film thickness ranging from 2.2–2.48 mils):

Layer 1: 94% HEAO-2 + 6% MB3 (19.3% of total thickness of layers 1–8).
Layer 2: HEAO-2 (18.0% of total thickness of layers 1–8).
Layer 3: 50% COC-3 + 50% HEAO-1 (24.4% of total thickness of layers 1–8).
Layer 4: TIE-4 (4.4% of total thickness of layers 1–8).
Layer 5: EVOH-3 (8.3% of total thickness of layers 1–8).
Layer 6: Tie-4 (3.4% of total thickness of layers 1–8).
Layer 7: Tie-4 (10.1% of total thickness of layers 1–8).
Layer 8: 96% a-PA-1 + 2% MB-1 + 2% MB-4 (12.1% of total thickness of layers 1–8).

EXAMPLE 4

Again with reference to FIG. 1, a multilayer film in accordance with the present invention was made as described in Example 1 and had the following eight-layer structure (total film thickness ranging from 2.0–2.2 mils):

Layer 1: 94% HEAO-2 + 6% MB3 (21.3% of total thickness of layers 1–8).
Layer 2: HEAO-2 (18.0% of total thickness of layers 1–8).
Layer 3: 60% COC-3 + 40% HEAO-1 (18.1% of total thickness of layers 1–8).
Layer 4: TIE-4 (4.4% of total thickness of layers 1–8).
Layer 5: EVOH-3 (9.8% of total thickness of layers 1–8).
Layer 6: Tie-4 (4.0% of total thickness of layers 1–8).
Layer 7: Tie-4 (12.0% of total thickness of layers 1–8).
Layer 8: 96% a-PA-1 + 2% MB-1 + 2% MB-4 (12.5% of total thickness of layers 1–8).

The films of Examples 1, 2, 3 and 4 where subjected to several analyses. The seal temperature range was determined by testing film on a Hayssen® RT 1800 packaging machine packaging actual or simulated 1 lb blocks of cheese at a set speed of 50–70 packages per minute. The bottom of the seal temperature range reported was the minimum temperature required to achieve hermetic seals. The top of the seal temperature range reported was the maximum temperature at which the film could be cut by the package separation (i.e., transverse cut) knife on the machine, without failing to completely cut due to permanent plastic deformation of the film, or due to tensile yielding in the region immediately adjacent to the seal bar.

Complex Modulus was measured in accordance with ASTM D 5026-90 (hereby incorporated in its entirety, by reference thereto), was measured in psi (i.e., pounds per square inch) in the machine direction (MD).

Yield Point and Elongation at Yield was measured in accordance with ASTM D-882 (hereby incorporated in its entirety, by reference thereto), was measured at room temperature (i.e., 23° C.) as well as elevated temperature (i.e., 93° C.). The yield point is the point of zero slope on a stress-strain plot.

Cutting Rating was evaluated based on the capability of the transverse cutter in the Hayssen® RT 1800 packaging machine to make a consistently clean cut, separating adjacent packages from each other. The evaluation was made at the high end of the seal temperature range, this temperature being provided for each example in Table II below.

Curl Rating was based on a subjective observation of each film's tendency to curl or lay flat when placed on a flat surface at room temperature; a scale of 1 to 5 was used with "1" indicating excellent flatness and "5" indicating highly problematic curling.

Shrinkage, i.e., free shrink, was measured at 150° C. in accordance with ASTM D 2732, which is hereby incorporated in its entirety, by reference thereto.

Oxygen Transmission Rate (OTR) was measured in accordance with ASTM D 3985, which is hereby incorporated in its entirety, by reference thereto. OTR was expressed as cc of oxygen per square meter of film per 24 hour period at 1 atmosphere and at a temperature of 73° F., at 0% relative humidity.

The results of the above analyses and evaluations are provided in Table II, below. Corresponding results for Comparative Film A are also provided. Comparative Film A is represented by FIG. 1 and had the following structure and composition:

Layer 1: 88% HEAO1 + 10% LDPE + 2% MB3 (12% of total thickness of layers 1–8).
Layer 2: 90% HEAO1 + 10% LDPE (19% of total thickness of layers 1–8).
Layer 3: TIE-1 (10% of total thickness of layers 1–8).
Layer 4: 80% PA6-2 + 20% aPA-1 (6.5% of total thickness of layers 1–8).
Layer 5: EVOH-2 (8% of total thickness of layers 1–8).
Layer 6: 80% PA6-2 + 20% aPA-1 (6.5% of total thickness of layers 1–8).
Layer 7: TIE-1 (25% of total thickness of layers 1–8).
Layer 8: 96% PA6-2 + 2% MB-1 + 2% MB-4 (13% of total thickness of layers 1–8).

TABLE II

| Test | Film of Example 1 | Film of Example 2 | Film of Example 3 | Film of Example 4 | Film of Comparative Film A |
|---|---|---|---|---|---|
| Seal Temperature Range (° C.) | 93–152 | 93–150 | 93–116 | 93–110 | See note |
| Complex Modulus at 23° C. MD/TD (psiX1000) | 215 | 185 | 154 | 194 | 115 |
| Complex Modulus at 100° C. MD/TD (psiX1000) | 113 | 90 | 73 | 93 | 29 |
| Complex Modulus at 121° C. MD/TD (psiX1000) | 90 | 72 | 44 | 68 | 13 |
| Complex Modulus at 150° C. MD/TD (psiX1000) | 65 | 53 | 14 | 22 | 10 |
| Yield Point (PSI) (23° C./93° C.) | 5010/2050 | 4660/1660 | 3740/1510 | 4650/1870 | 2910/909 |
| Elongation at Yield (%) (23° C./93° C.) | 5.9/4.0 | 6/4.2 | 6.1/4.2 | 6.1/4.2 | 7.6/17 |
| Cutting Rating (1 = excellent; 5 = poor) | 1 | 1 | 1 | 1 | 5 |
| Curl Rating (1 = excellent; 5 = poor) | 1 | 1 | 1 | 1 | 1 |
| Shrinkage LD/TD (%) | 0 | 0 | 0 | 0 | 0 |
| Oxygen Transmission Rate | <6 | <6 | <6 | <6 | <6 |

Note:
T6225B failed to cut at the minimum temperature required for a hermetic seal.

Figure 2:
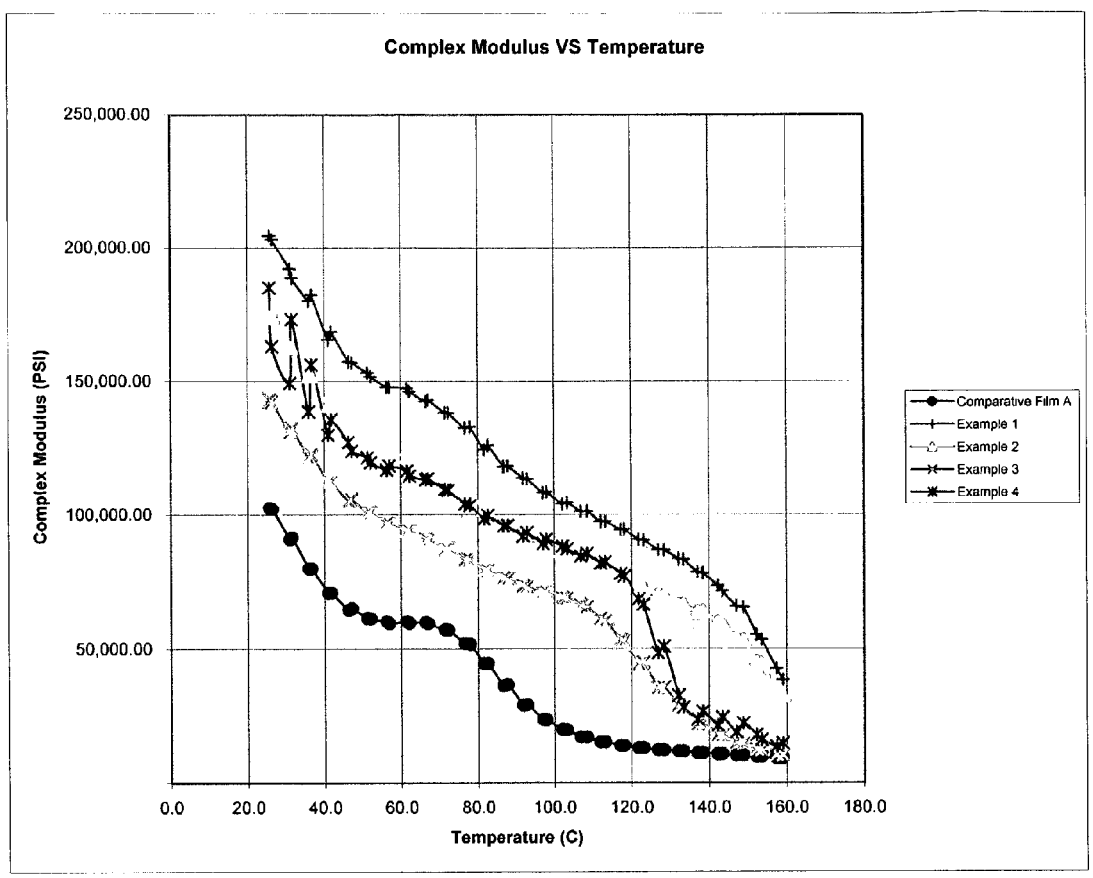
FIG. 2 is a plot of complex modulus as a function of temperature for various films in accordance with the invention as well as comparative films.

As indicated in Table II, the films of Examples 1 and 2 maintain high complex modulus, i.e., greater than 50,000 psi, at temperatures exceeding 150° C. This is illustrated graphically in FIG. 2, which is a plot of complex modulus versus temperature. In FIG. 2, the modulus measurement was in the machine direction as this was the critical direction for the horizontal form fill and seal application.

In addition, both films exhibited 0% total free shrink (i.e., MD+TD) at 150° C., and therefore have 0% shrink at lower temperatures, e.g., at 130° C., 120° C., etc. These properties, i.e., high modulus and no shrink at elevated temperatures, result in excellent dimensional stability at high temperatures such as are experienced during various packaging operations as discussed hereinabove.

The data in Table II also indicates that the films have excellent flatness, i.e., a very low tendency to curl. This greatly facilitates the handling and processing of the films during packaging, particularly as the films are being moved and manipulated in the packaging machinery. Finally, the films also exhibit a very low OTR, a highly beneficial property for the packaging of perishable items such as food products.

As shown by the results in Table 3, below, the complex modulus of Comparative Film A decreases dramatically relative to examples 1–4 and particularly relative to Examples 1 and 2 as the temperature of the film samples increases. This is particularly noteworthy for the temperature range of 91° C. to 150° C., which is the ideal seal temperature range for the materials when they are utilized in a form fill seal packaging process.

TABLE III

Complex Modulus (psi, in the machine direction)

| Temperature ° C. | Comparative Film A | Example 1 | Example 2 | Example 3 | Example 4 |
| --- | --- | --- | --- | --- | --- |
| 26.5 | 102,125.25 | 203,180.61 | 174,641.42 | 142,370.21 | 163,014.38 |
| 31.6 | 91,579.28 | 188,558.34 | 162,512.80 | 132,536.26 | 173,028.62 |
| 36.7 | 79,931.68 | 182,187.44 | 151,934.03 | 122,768.31 | 156,177.29 |
| 41.8 | 70,959.01 | 168,428.65 | 141,608.48 | 112,429.45 | 135,655.39 |
| 46.3 | 64,511.90 | 157,279.52 | 134,464.67 | 105,275.57 | 127,175.05 |
| 51.4 | 61,305.15 | 153,091.76 | 129,320.82 | 101,016.46 | 121,443.58 |
| 56.4 | 60,246.71 | 147,890.58 | 125,262.27 | 97,174.18 | 116,792.67 |
| 61.6 | 60,262.66 | 147,421.22 | 121,480.18 | 94,001.17 | 116,550.78 |
| 66.5 | 59,936.06 | 142,489.68 | 118,694.15 | 91,033.81 | 113,156.25 |
| 71.6 | 57,228.80 | 138,283.50 | 113,619.79 | 87,167.91 | 109,493.58 |
| 76.7 | 52,105.76 | 132,626.71 | 107,540.86 | 83,412.66 | 104,071.23 |
| 81.7 | 44,542.38 | 124,435.13 | 101,942.00 | 79,350.17 | 98,473.97 |
| 86.8 | 36,257.69 | 118,098.26 | 95,656.76 | 76,593.29 | 95,884.31 |
| 91.9 | 29,044.49 | 113,870.95 | 90,156.33 | 73,682.76 | 92,057.78 |
| 97.1 | 23,730.50 | 108,331.80 | 86,392.53 | 71,060.47 | 89,258.17 |
| 103.3 | 19,702.37 | 104,678.21 | 82,364.90 | 68,981.13 | 87,331.71 |
| 108.5 | 17,077.70 | 101,469.49 | 79,816.03 | 65,710.73 | 85,484.21 |
| 113.2 | 15,243.75 | 97,568.18 | 77,044.90 | 60,500.16 | 82,317.69 |
| 118.2 | 13,905.35 | 94,661.58 | 74,485.25 | 52,998.75 | 77,019.26 |
| 123.1 | 13,028.98 | 90,579.17 | 72,054.87 | 45,101.20 | 66,585.83 |
| 128.4 | 12,349.33 | 86,937.63 | 69,441.35 | 35,749.40 | 50,934.54 |
| 133.4 | 11,755.55 | 83,347.77 | 66,349.20 | 27,779.36 | 28,136.97 |
| 138.4 | 11,225.40 | 78,261.83 | 63,646.48 | 22,116.21 | 26,659.74 |
| 143.5 | 10,785.38 | 71,675.95 | 59,005.54 | 17,918.37 | 24,448.88 |
| 148.8 | 10,267.29 | 65,542.74 | 53,019.73 | 14,712.62 | 22,261.04 |
| 153.5 | 9,754.76 | 53,443.44 | 44,081.58 | 12,341.97 | 16,075.96 |
| 159.0 | 9,238.37 | 38,451.82 | 32,342.38 | 10,422.71 | 14,759.73 |

All subranges of all ranges expressly disclosed herein are hereby expressly disclosed. All references to ASTM protocols are to the most-recently published ASTM procedure on the priority (i.e., original) filing date of this patent application in the United States Patent Office.

While the invention has been described with reference to illustrative examples, those skilled in the art will understand that various modifications may be made to the invention as described without departing from the scope of the claims which follow.

What is claimed is:

1. A packaging process comprising the steps of:
(A) supplying an elongate multilayer film comprising:
  (i) a first layer comprising cyclic olefin copolymer having a glass transition temperature of at least 125° C.;
  (ii) a second layer comprising at least one member selected from the group consisting of cyclic olefin copolymer having a glass transition temperature of at least 125° C., polyamide, polyester, and polystyrene; wherein the first and second layers are on opposite sides of a tensile axis of symmetry of the multilayer film, with the film exhibiting from 0 to 45 degrees of transverse edge curl, a yield point of at least 1200 psi at a temperature of 85° C., and an elongation at break of from 0 to 300 percent at 85° C.;
(B) placing a plurality of product units on the film at desired intervals;
(C) forwarding the film having product units thereon, while:
(D) forming a tubing from the film so that product is inside the tubing upon reconfiguring the film to a tubing around the product, with longitudinal edge portions of the film being adjacent one another once the film has been reconfigured;
(E) forming a longitudinal seal along a segment of the adjacent edge portions of the film, to form a sealed tubing segment, with a single product unit being inside of the sealed tubing segment;
(F) forming a first transverse seal across the sealed tubing segment at a first location which is downstream of the single product unit;
(G) severing the film downstream of the first transverse seal, and
(H) forming a second transverse seal across the sealed tubing segment at a second location which is upstream of the single product unit; and
(I) severing the sealed tubing segment from the multilayer film upstream of the second transverse seal, whereby a discrete packaged product is formed with the single product unit surrounded by the multilayer film; and
wherein the forwarding of the film having the product units thereon is carried out by pulling on the film tubing with a means for making the first transverse seal and thereafter with a means for making the second transverse seal, while both the means for making the first transverse seal and the means for making the second transverse seal are at a temperature high enough to seal an inside layer of the film to itself.

2. The process according to claim 1, wherein the means for making the first transverse seal comprises a seal bar having a temperature of from 70° C. to 150° C., and the means for making the second transverse seal comprises a seal bar having a temperature of from 70° C. to 150° C.

3. The process according to claim 1, wherein the film having the product units thereon is forwarded horizontally.

4. The process according to claim 3, wherein each of the product units comprises cheese.

5. The process according to claim 4, wherein each product unit is an individual cheese block.

6. The process according to claim 4, wherein each product unit is a set of stacked slices of cheese.

7. The process according to claim 4, wherein each product unit is a set of shingled slices of cheese.

8. The process according to claim 1, wherein the multilayer film exhibits a yield point of at least 1200 psi at a temperature of 100° C., and an elongation at break of up to 200 percent at 100° C.

9. The process according to claim 8, wherein the film exhibits a exhibits a yield point of at least 1200 psi at a temperature of 120° C., and an elongation at break of up to 300 percent at 120° C.

10. The process according to claim 9, wherein the film exhibits a exhibits a yield point of at least 1200 psi at a temperature of 130° C., and an elongation at break of up to 300 percent at 130° C.

11. The process according to claim 10, wherein the film exhibits a exhibits a yield point of at least 1200 psi at a temperature of 140° C., and an elongation at break of up to 300 percent at 140° C.

12. The process according to claim 11, wherein the film exhibits a exhibits a yield point of at least 1200 psi at a temperature of 150° C., and an elongation at break of up to 300 percent at 150° C.

13. The process according to claim 12, wherein the film exhibits a complex modulus of from 30,000 to 500,000 psi throughout a temperature range of from 100° C. to 150° C.

14. The process according to claim 1, wherein the film has a thickness of from 0.5 mil to 10 mils.

15. The process according to claim 1, wherein the film further comprises a seal layer which comprises at least one member selected from the group consisting of homogeneous ethylene/alpha-olefin copolymer, very low density polyethylene, ionomer, ethylene/unsaturated ester copolymer, and ethylene/unsaturated acid copolymer.

16. The process according to claim 1, wherein the film further comprises an $O_2$-barrier layer comprising at least one member selected from the group consisting of polyvinylidene chloride, hydrolyzed ethylene vinyl acetate copolymer, polyamide, polyalkylene carbonate, polyacrylonitrile.

17. The process according to claim 1, wherein the film further comprises a tie layer which comprises at least one member selected from the group consisting of modified ethylene/alpha-olefin copolymer, modified ethylene/unsaturated ester copolymer, modified ethylene/unsaturated acid copolymer, and polyurethane.

18. The process according to claim 1, wherein the film comprises a crosslinked polymer network.

19. The process according to claim 1, wherein the film has a total free shrink of less than 10 percent at 185° F.

20. The process according to claim 1, wherein the film is a flat film.

* * * * *